US009608971B2

(12) United States Patent
Gronowski et al.

(10) Patent No.: US 9,608,971 B2
(45) Date of Patent: Mar. 28, 2017

(54) METHOD AND APPARATUS FOR USING A BOOTSTRAPPING PROTOCOL TO SECURE COMMUNICATION BETWEEN A TERMINAL AND COOPERATING SERVERS

(75) Inventors: Kristoffer Gronowski, Saratoga, CA (US); Shingo Murakami, Kanagawa (JP); Mats Näslund, Bromma (SE)

(73) Assignee: Telefonaktiebolaget LM Ericcson (publ), Stockholm (SE)

( * ) Notice: Subject to any disclaimer, the term of this patent is extended or adjusted under 35 U.S.C. 154(b) by 215 days.

(21) Appl. No.: 14/342,414

(22) PCT Filed: Sep. 8, 2011

(86) PCT No.: PCT/EP2011/065529
§ 371 (c)(1),
(2), (4) Date: Mar. 3, 2014

(87) PCT Pub. No.: WO2013/034187
PCT Pub. Date: Mar. 14, 2013

(65) Prior Publication Data
US 2014/0215217 A1 Jul. 31, 2014

(51) Int. Cl.
*H04L 9/08* (2006.01)
*H04L 29/06* (2006.01)

(52) U.S. Cl.
CPC ............ *H04L 63/062* (2013.01); *H04L 9/083* (2013.01); *H04L 9/0816* (2013.01);
(Continued)

(58) Field of Classification Search
CPC . H04L 2209/56; H04L 2209/80; H04L 63/06; H04L 63/061; H04L 63/062;
(Continued)

(56) References Cited

U.S. PATENT DOCUMENTS

2007/0234041 A1   10/2007   Lakshmeshwar et al.
2013/0290723 A1*  10/2013   Yu .................... H04W 4/005
                                                   713/171
2014/0196127 A1*  7/2014    Smeets ............... H04L 63/0815
                                                   726/5

FOREIGN PATENT DOCUMENTS

WO       2009070075 A1    6/2009
WO    WO 2009070075 A1 *  6/2009   .......... H04L 63/061
                  (Continued)

OTHER PUBLICATIONS

Hunt, P., "OAuth: New Chain Grant Type," Independent Identity; Oracle Corporation. Mar. 1, 2011. pp. 1-3.
(Continued)

*Primary Examiner* — Theodore C Parsons
(74) *Attorney, Agent, or Firm* — Murphy, Bilak & Homiller, PLLC

(57) ABSTRACT

A method comprising the use of a bootstrapping protocol to define a security relationship between a first server and a second server, the first and second servers co-operating to provide a service to a user terminal. A bootstrapping protocol is used to generate a shared key for securing communication between the first server and the second server. The shared key is based on a context of the bootstrapping protocol, and the context is associated with a Subscriber Identity Module (SIM) associated with the user terminal and provides a base for the shared key. A method of the invention may, for example, be employed within a computing/service network such as a "cloud", and in particular for communications between two servers in the cloud that are co-operating to provide a service to a user.

22 Claims, 9 Drawing Sheets

(52) U.S. Cl.
CPC .......... *H04L 9/0819* (2013.01); *H04L 9/0838* (2013.01); *H04L 63/061* (2013.01); *H04L 63/083* (2013.01); *H04L 63/0853* (2013.01); *H04L 2209/56* (2013.01); *H04L 2209/80* (2013.01)

(58) Field of Classification Search
CPC . H04L 63/0853; H04L 9/0816; H04L 9/0819; H04L 9/083; H04L 9/0838
See application file for complete search history.

(56) References Cited

FOREIGN PATENT DOCUMENTS

| | | | |
|---|---|---|---|
| WO | WO 2010114475 A2 * | 10/2010 | ........... H04L 12/189 |
| WO | 2011135529 A2 | 11/2011 | |

OTHER PUBLICATIONS

Author Unknown, "Introducing a UICC-based Generic Bootstrapping Architecture," Siemens; 3GPP TSG SA WG3 Security—S3#32; S3-040089; Feb. 9-13, 2004. pp. 1-3. Edinburgh, Scotland, UK.

3rd Generation Partnership Project, "3GPP TS 33.223 V10.0.0 (Mar. 2011)," 3rd Generation Partnership Project;Technical Specification Group Services and System Aspects; Generic Authentication Architecture (GAA); Generic Bootstrapping Architecture (GBA) Push function (Release 10). Mar. 2011. pp. 1-23.

3rd Generation Partnership Project, "3GPP TS 33.220 V10.0.0 (Oct. 2010)," 3rd Generation Partnership Project; Technical Specification Group Services and System Aspects; Generic Authentication Architecture (GAA); Generic Bootstrapping Architecture (GBA) (Release 10). Oct. 2010. pp. 1-75.

* cited by examiner

First, second servers co-operating    41

↓ bootstrapping protocol    42

Figure 4

Receive request from second server    51

↓

Send request to BSF    52

↓

Receive key    53

Figure 5

Receive request from  61
first server

↓

Generate key  62

↓

Send to first server  63

↓

Receive request from  64
second server

↓

Send to second server  65

Figure 6

METHOD AND APPARATUS FOR USING A BOOTSTRAPPING PROTOCOL TO SECURE COMMUNICATION BETWEEN A TERMINAL AND COOPERATING SERVERS

TECHNICAL FIELD

The present invention relates to a method of providing enhanced security for communications, for example within a computing/service network such as a "cloud", and in particular for communications between two applications in the cloud that are co-operating to provide a service to a user. A method of the invention is applicable not only to full-fledged "clouds", but also to cases where several entities or servers are involved in providing a service for an end user but where not all of these servers communicate directly with the user—for example a so-called "mash up" type of service where data or functionality from two or more sources are combined to create a new service.

BACKGROUND

There is increasing interest in, and use of, "cloud computing". A computing "cloud" is a pool of configurable computing resources (for example networks, servers, memory, applications and services) that may be accessed by a user. A user may for example store their data or applications in the cloud rather than on their own computer, and access the cloud whenever they wish to retrieve data or run an application.

Cloud computing has many promises for the future, providing on-demand, self-provisioned services with elastic capacity at low cost. However, security is often seen as the most important problem that must be overcome in order to persuade users to adopt cloud computing. This is because in a cloud setting, the user (e.g. an enterprise) outsources computing, networking and storage resources to an external party and thus needs to trust this party to provide the necessary security against external attackers and, moreover, must trust the cloud provider not to spy. In a so called "public cloud", where several users share the same cloud, the situation is worse since the user must also trust the cloud provider to protect the user's data, applications etc against "insiders" in the form of other users of the cloud (so called "cloud tenants").

A fundamental requirement in order to provide the required security is to be able to encrypt data in the cloud, which in turn requires key management.

A number of ways of providing encryption in cloud computing have been proposed. However, all previous proposals have disadvantages.

As one example, a cloud user could encrypt all data locally, and allow only encrypted data to be exported to the cloud. This however means that no processing would be possible in the cloud and the cloud can only be used to provide transport and storage of (encrypted) data. While so called homomorphic encryption (enabling processing of encrypted data) has recently been developed, these techniques are still mainly of academic interest since processing overhead is counted in minutes or hours.

On the other hand, if data are not encrypted locally, this means that a user must trust the cloud provider to have a secure key management scheme in place, so that data may be encrypted before being stored and/or transported within the cloud or to/from the cloud. Traditional means for such key management are certificates and PKI (Public Key Infrastructure). Such solutions are however computationally heavy and are completely decoupled from the user: the user has little or no ability to influence how keys are used in the cloud nor any means to verify that keys are used as claimed (e.g. as claimed in a service level agreement (SLA) between a user and a cloud provider). So called remote attestation can be used to verify that certain software is used in a cloud, but this does not guarantee that any specific keys are used by the software/applications. For example, a server in the cloud could have a malfunctioning random number generator, always producing the key 000 . . . 0, but remote attestation would not show this. (Attestation does not provide means to verify that the random number generator is operating properly, at best it can verify it has been "installed".)

GBA (Generic Bootstrapping Architecture, 3GPP TS33.220) provides a more efficient alternative to PKI, but requires that the end user is one of the "endpoints" of the security. That is GBA only works when the user is directly involved in the secure communication, initiating or terminating the security. If there is need to securely communicate between two servers (referred to as Network Application Functions or NAFs in GBA), the communication between two NAFs would either need to be relayed by the UT (consuming UT and access network resources) or would need to rely on some of the aforementioned disadvantageous prior arts methods to set up security directly between the NAFs.

WO 2009/070075 proposes a method of managing session keys for secure communication between a first user device and a second user device. However, this again requires that the end user is one of the "endpoints" of the security.

SUMMARY

A first aspect of the present invention provides a method comprising the use of a bootstrapping protocol to define a security relationship between a first server and a second server. The first and second servers are co-operating to provide a service to a user terminal. The bootstrapping protocol is used to generate a shared key for securing communication between the first server and the second server, and the shared key is based on a context of the bootstrapping protocol. The context of the bootstrapping protocol is associated with a Subscriber Identity Module (SIM) associated with the user terminal, and the context provides base for the shared key.

The invention thus provides a method of using a bootstrapping protocol to provide a security relationship for server-to-server communication for traffic related to a given user, even though the user is not one of the end points of the server-to-server communication. FIG. 1 illustrates one application of the invention—two servers AS1, AS2 in a cloud are co-operating to provide a service to a user terminal. The servers AS1, AS2 have to communicate with one another in order to the deliver the service to the user, and the present invention may be used to secure communication between server AS1 and server AS2 and vice-versa.

As noted, the invention is applicable not only to full-fledged clouds, but also to "mash up" type of services, where several entities/servers are involved in providing a service for the end user (which may perhaps be considered as a sort of cloud service) but where not all of these servers communicate directly with the user.

The user terminal may for example be a mobile terminal, such as a mobile telephone, although the invention is in principle not limited to a mobile user terminal.

The user terminal is associated with a Subscriber Identity Module (SIM) used to authenticate the subscriber.

By a "shared key" is meant a key to which the first server and the second server both have access. (It should be noted that the invention is not limited to a case where the first and second server are the only servers involved in the security relationship, ie to a security relationship involving only two servers. The invention may be applied in a case where three or more servers are co-operating to provide a service to a user terminal. In a case where only two servers are co-operating to provide the service to the user terminal the key may be called a "pairwise" shared key, and in a case where three or more servers are co-operating to provide the service to the user terminal the key may be called a "group" shared key.)

The bootstrapping protocol may be a GBA (Generic Bootstrapping Architecture) protocol.

The method may comprise sending, from the first server to a bootstrapping server, a request to establish a security relationship between the first server and the second server. The request includes an indication of the identity of the context of the bootstrapping protocol.

The request to establish a security relationship between the first server and the second server informs the bootstrapping server that the request relates to server-to-server communication. Moreover, as the request includes an indication of the identity of the context of the bootstrapping protocol, the bootstrapping server is then able to associate a context of the bootstrapping protocol with the Subscriber Identity Module (SIM) associated with the user terminal.

The first server may send the request to the bootstrapping server in response to receipt at the first server of a message from the second server. The received message requests establishment of a security relationship between the first server and the second server, and includes a second indication of the identity of the context of the bootstrapping protocol. The second indication may be identical to the indication. (It should however be noted that the indication of the identity of the context of the bootstrapping protocol included in the message sent from the first server to the bootstrapping server may in principle be different from the second indication of the identity of the context of the bootstrapping protocol included in the message sent from the second server to the first server. It may however be convenient for the two messages to include the same indication of the identity of the context, that is for the second indication to be identical to the first indication—for example both message may include a Bootstrapping Transaction Identifier (B-TID) that identifies the context.)

The method may further comprise receiving, at the first server and from the bootstrapping server, the shared key or information from which the shared key can be derived. The shared key, or information from which the shared key can be derived, is received from the bootstrapping server which has generated the shared key.

The method may comprise receiving, at a bootstrapping server, a request from the first server to establish a security relationship between the first server and the second server. The request includes an indication of the identity of the context of the bootstrapping protocol. As noted, the request to establish a security relationship between the first server and the second server informs the bootstrapping server that the request relates to server-to-server communication. Moreover, as the request includes an indication of the identity of the context of the bootstrapping protocol, the bootstrapping server is then able to associate a context of the bootstrapping protocol with an SIM associated with the user terminal.

The method may further comprise generating, at the bootstrapping server, the shared key. The bootstrapping server then sends to the first server the shared key or information from which the shared key can be derived.

The method may further comprise receiving, at the bootstrapping server, a request from the second server to establish a security relationship between the second server and the first server. The request includes an indication of the context of the bootstrapping protocol. The method then comprises sending, from the bootstrapping server to the second server, the shared key or information from which the shared key can be derived. The first server and second server are then each in possession of the shared key or of information from which they can derive the shared key, and the first server and second server can thus start to communicate with one another using the shared key to secure their communications.

Alternatively, the method may comprise the user terminal defining the security relationship between the first server and the second server. This has the advantage that little or no modification is required to the first or second server, and that a conventional bootstrapping server may be used.

The method may comprise the user terminal generating the shared key for securing communications between the first server and the second server.

The user terminal may generate the shared key based on a key for securing communications between the user terminal and the first server and on a key for securing communications between the user terminal and the second server.

The user terminal may send the shared key, or information from which the shared key may be derived, to the first and second servers. The first server and second server are then each in possession of the shared key or of information from which they can derive the shared key, and the first server and second server can thus start to communicate with one another using the shared key to secure their communications.

The method may further comprise verifying the existence of the security relationship between the first server and the second server. This feature provides assurance that the security relationship between the first server and the second server has been set (as explained above, the invention makes it possible to set up a security relation between the first server and the second server for communications relating to the user terminal—but this does not necessarily mean that the first and second servers will always set up the security relation). For example, the method may comprise verifying that the first server and/or the second server is indeed possession of the shared key. Additionally or alternatively, the method may comprise verifying by means of remote attestation use of the shared key by the first server and/or the second server.

A second aspect of the invention provides a server adapted to use a bootstrapping protocol to define a security relationship between a first server and a second server co-operating to provide a service to a user terminal. The server is adapted to use the bootstrapping protocol to generate a shared key for securing communication between the first server and the second server. A context of the bootstrapping protocol is associated with a Subscriber Identity Module (SIM) associated with the user terminal, and provides a base for the shared key.

The server may be the first server or the second server.

The server may be adapted to send, to a bootstrapping server, a request to establish the security relationship. The request includes an indication of the identity of the context of the bootstrapping protocol.

The server may be adapted to support verification that the server is in possession of the shared key and/or to support verification by remote attestation of use of the shared key by the server.

Alternatively the server may be a bootstrapping server. The server may be adapted to generate the shared key in response to receipt from the first server or the second server of a request to establish the security relationship.

The bootstrapping protocol may be a GBA (Generic Bootstrapping Architecture) protocol.

A third aspect of the invention provides a user terminal adapted to use a bootstrapping protocol to define a security relationship between a first server and a second server co-operating to provide a service to the user terminal. The user terminal is adapted to support generation, using a Subscriber Identity Module (SIM) associated with the user terminal, of a shared key for securing communication between the first server and the second server. A context of the bootstrapping protocol is associated with the SIM, and provides a base for the shared key.

The user terminal may be adapted to support generation of the shared key based on a key for securing communications between the user terminal and the first server and on a key for securing communications between the user terminal and the second server.

The user terminal may be adapted to communicate with the first server and/or the second server to verify the existence of the security relationship between the first server and the second server. It may, for example, be adapted to verify that the first server and/or the second server is in possession of shared key. Additionally or alternatively, the user terminal may be adapted to support verification by means of remote attestation use of the shared key by the first server and/or the second server.

The bootstrapping protocol may be a GBA (Generic Bootstrapping Architecture) protocol.

A fourth aspect of the invention provides a Subscriber Identity Module (SIM) for a user terminal. The SIM is adapted to use a bootstrapping protocol to define a security relationship between a first server and a second server co-operating to provide a service to the user terminal. The SIM is also adapted to generate a shared key for securing communication between the first server and the second server. A context of the bootstrapping protocol is associated with the Subscriber Identity Module (SIM), and provides a base for the shared key.

The SIM may be adapted to generate the shared key based on a key for securing communications between the user terminal and the first server and on a key for securing communications between the user terminal and the second server.

The SIM may for example be implemented as software.

A fifth aspect of the invention provides a computer readable medium containing instructions that, when executed by a user terminal, causes the user terminal to perform a method of the first aspect.

A sixth aspect of the invention provides a computer readable medium containing instructions that, when executed by a server, causes the server to perform a method of the first aspect.

BRIEF DESCRIPTION OF THE DRAWINGS

FIG. 4 shows a block flow diagram showing principal steps of a method of the invention;

FIG. 5 is a block flow diagram showing principal steps performed by an application server in a method according to the first embodiment of the invention;

FIG. 6 is a block flow diagram showing principal steps performed by a bootstrapping server in a method according to the first embodiment of the invention;

DETAILED DESCRIPTION

Figure 1:
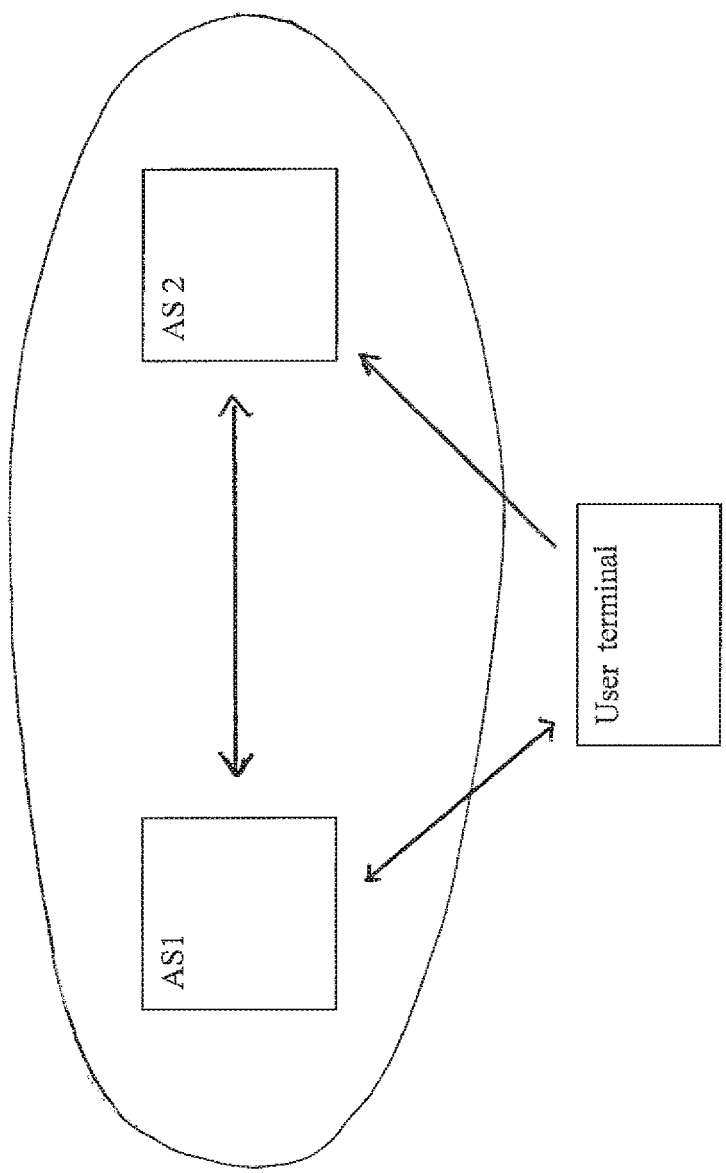
FIG. 1 is a schematic illustration of a user communicating with two application servers in cloud.

As will be understood from the introduction above, it would be beneficial to have a solution which provides at least one and preferably all of the following:
1. The user and/or a party highly trusted by the user, e.g. a network operator, has some means to control which keys are used to secure communications between two (or more) entities in the cloud.
2. The user has some simple means to obtain some assurance that keys are used (or at least have been generated) as claimed in the cloud.
3. The keys can be shared between two (or more) entities (e.g. servers) even though not all (or even none) of these entities communicate directly with (or via) the user.

Note that the need to involve (at least) one trusted party is not really an issue. Since we assume it to be infeasible and/or undesirable to do all encryption locally at the user, the user must have trust in the operator providing the user with connectivity to/from the cloud, since this operator would otherwise be able to spy on communications between the user and the cloud. Hence the trust model used in this application is that the user has one trusted party (e.g. an operator) but does not fully trust the cloud provider(s), in the sense that the user would like to have control/impact over the cloud providers' key management. (Of course, the user must have some amount of trust also in the cloud provider. For example, the cloud provider must be trusted not to delete or modify users' data.)

The basic idea is to use the Generic Bootstrapping Architecture (GBA) as defined in 3GPP. This, as such, will provide keys for an application in a secure way, based on a (U)SIM card ((Universal) Subscriber Identity Module) or other user-associated credential, e.g. a password. However, GBA is a client-server oriented protocol and can (as such) only provide keys for case where the user is involved in the communication as already discussed.

Co-pending PCT application PCT/IB2011/051852 suggests an extension of the GBA protocol to a case where a server S in the cloud (without the user being directly involved) needs a key to encrypt data before storing it, and similarly requires the same key when later decrypting it. However, neither the conventional GBA protocol nor the extension proposed in PCT application PCT/IB2011/051852 addresses the situation where two servers, S1, S2, need to set up a secure channel over which a user's data will be transmitted. Additionally, PCT/IB2011/051852 is directly prohibitive to the cloud performing processing of users' data; it only allows the cloud to act as a storage means for the data.

WO 2009/070075 proposes use of a separate protocol, in addition to the GBA protocol, to create a "pairwise" key between two users. This mechanism cannot however be used to create a pairwise key between two servers acting on behalf of a user, as it requires that at least one of the communicating parties is a "GBA end-user".

Accordingly, the present invention proposes a further extension to the GBA protocol which can provide one or more pairwise keys (or one or more group keys in the case of three or more servers) for server-to-server communication (and if required, also processing) for traffic and data related to a given user.

The conventional GBA protocol is well known and it will not be described in detail in this application. For the purpose of the invention, it is only necessary to know that GBA can create a (security) context, comprising a key Ks, shared between a user terminal and a Bootstrapping Server Function (BSF). The context can be identified by a Bootstrapping Transaction Identifier (B-TID). From the key Ks, further keys (Ks_NAF), shared between the user terminal (henceforth denoted UT) and an application server (called NAF—Network Application Function—in GBA terminology). Apart from the NAF and the UT, only the user's operator (hosting the BSF) can deduce this key. In conventional GBA, there may be more than one NAF involved simultaneously (e.g. a UT may have simultaneous connections to plural different NAFs) in which case the GBA protocol will provide each NAF with a unique key that is not known by or deducible by any other NAF. Thus, current GBA in a sense effectively prevents sharing of keys between NAFs which in the context of the invention needs to be allowed, but in a controlled manned. The servers S1, S2 are considered NAFs (NAF1, NAF2) in the following.

It should be noted that servers may be physical servers, or may be virtual servers provided by a virtualization layer such as e.g. XEN or KVM. Also, as noted, the user terminal UT may be a mobile terminal.

The conventional GBA protocol has two variants, an on-line variant and an off-line variant (the latter called "GBA push"). This application will consider only the on-line case (where the user is at least attached to/registered in the network). This is due to the desire for the user to have some degree of "control", for example to be able to check whether the NAFs are indeed using the correct keys. In fact, one of skill in the art can easily see how the so called "embodiment 1" below can be extended to the GBA push context since it (like GBA push) does not require UT involvement in the bootstrapping. The basic idea is the following.

The servers perform either normal GBA bootstrapping (see embodiment 2) or a special variant of GBA bootstrapping (embodiment 1). In embodiment 1 the UT does not need to take an active part and the (two or more) NAFs directly obtain one or more pairwise key(s) (in the case of two NAFs) or one or more shared group keys (in the case of three or more NAFs). In embodiment 2 on the other hand, the UT will be involved directly in establishing one or more keys for securing communication between the NAFs. In both embodiments, the UT may later "check" that the NAFs are using the correct key(s).

The invention assumes the existence of a "cloud security manager" which keeps track of cloud resource usage e.g. by assigning virtual resources in response to the user's requests. The cloud security manager keeps track of which physical and/or virtual servers are currently delivering a service to a user and thus, on request by the user/UT, can reply with a list of those NAFs in the cloud currently handling the user's service(s). It may also keep a record of the B-TIDs associated with the UTs communicating with the cloud (the Bootstrapping Transaction Identifier, B-TID, will be recognized by the BSF and serves as an identifier both for the UT and the key Ks that the UT has obtained using the GBA protocol). This is particularly beneficial in embodiment 1 below, since in that case, the UT may not be able to provide the B-TID to the NAFs.

The following use cases may be illustrative to demonstrate possible applications of the invention.

UC1: Alice using a smart phone visits an online shopping site (NAF1). She selects an online wallet service (NAF2) for the payment. She is redirected to the online wallet service and authorizes the payment to the shopping site. She is then redirected back to the shopping site and confirms the shopping has successfully finished. In the background, the invention provides one or more keys (KsNAFNAF) for securing communication between NAF1 and NAF2, and NAF1 and NAF2 communicate securely with one another using the KsNAFNAF.

UC2: Bob using a smart phone visits a brand-new social network site (SNS, run by NAF1) to register himself. He starts creating his profile and decides to import his friends-list from his online address book service (NAF2). He is redirected to the address book service and authorizes the address book service to export selected friends to the SNS. He is then returned to the SNS and confirms he can successfully import the selected friends to the SNS. In the background, the invention provides one or more keys (KsNAFNAF) for securing communication between NAF1 and NAF2, and NAF1 and NAF2 communicate securely with one another using the KsNAFNAF.

UC1 and UC2 are examples of the need to perform "chained" service calls in an authenticated/authorized way between different services, e.g. by using the OAuth framework. OAuth can use GBA as security "back-end". See also www.independentid.com/2011/03/oauth-new-chain-grant-type.html, or Internet Draft "Chain Grant Type for OAuth2—draft-hunt-oauth-chain-00.txt" by Phil Hunt, Oracle Corporation, 1 Mar. 2011.

UC3: Alice is communicating with "the cloud". From Alice's point of view she is communicating with an APN (Access Point Name) (typically at a GGSN (Gateway GPRS Support Node) or PDN-GW (Packet Data Network GateWay). However, behind this APN there are two servers NAF1, NAF2 involved in the data flow so that traffic flows: UT→APN→NAF1→NAF2 (and vice versa). There may be security provided between Alice's UT and the APN/GW (at least over the radio/access network), but there is usually no protection on the links: APN→NAF1, NAF1→NAF2. It is therefore desirable provide keys to secure the links APN-→NAF1, NAF1→NAF2, to provide security for all links between the UT and NAF2. The most straightforward prior art methods available to secure all links in the UC3 example would be to use "per-hop" establishment of keys between each pair of communicating "adjacent" NAFs using PKI (Public Key Infrastructure). However, this would imply application of expensive PKI operations on each "hop". Moreover, the user/operator would have no influence or control over these keys. The present invention allows each hop in the UC3 example to be protected by use of the GBA protocol, thus allowing user influence and avoiding the need to use PKI operations. Moreover since the invention allows key management to be decoupled from the infrastructure (cloud) provider, it can scale to cases involving two or more different clouds—that is, the invention allows cloud providers to save on the need to invest in PKI and reduces the need for cloud providers to make "security agreements" with other cloud providers.

The invention will be described with reference to examples in which communications between two application servers in the cloud are secured using a single key. The invention is not however limited to this and may be applied to cases in which communications between two application servers in the cloud are secured using two or more keys. As is easily seen, when more than one key is needed either any additional keys can be obtained by sequential repetition of the invention (using e.g. a nonce to ensure distinct keys each time), or one or more additional keys may be locally derived by the NAFs from the shared key.

The examples described below involve a User Terminal (UT), to which a service is being provided. In the examples UC1 to UC3 given above the UT is associated with a human user, but the invention is not in principle limited to a human user of the UT—for example the UT may be a terminal in a machine to machine ("M2M") communication, i.e. a terminal without a human user. The UT may be fixed or mobile, and may use wired or wireless network access technology.

The UT has an associated Subscriber Identity Module. This may be any type of Subscriber Identity Module, such as a SIM-card, any kind of "prefix-SIM-card" such as, for example, a USIM (Universal Subscriber Identity Module)-card, an MCIM (Machine Communications Identity Module), or any kind of software SIM. The UT could alternatively use passwords (stored or user provided), certificates or any other means for user credential management that can be used for GBA bootstrapping.

The subscriber behind the SIM associated with the UT may or may not be the actual user of the UT. For example, the subscriber may be an enterprise and the user may be a person employed or otherwise contracted by that enterprise.

FIG. 4 illustrates the principal features of a method of the present invention. At 41 in FIG. 4, two (or more) servers are co-operating to provide a service to a user terminal UT, for example to a mobile terminal. At 42 in FIG. 4 a bootstrapping protocol is used to define a security relationship between the servers. Specifically, the bootstrapping protocol is used to generate a shared key for securing communication between the servers and the second server. A context of the bootstrapping protocol is associated with a Subscriber Identity Module (SIM) of the user terminal UT and provides a base for the shared key.

Figure 2:
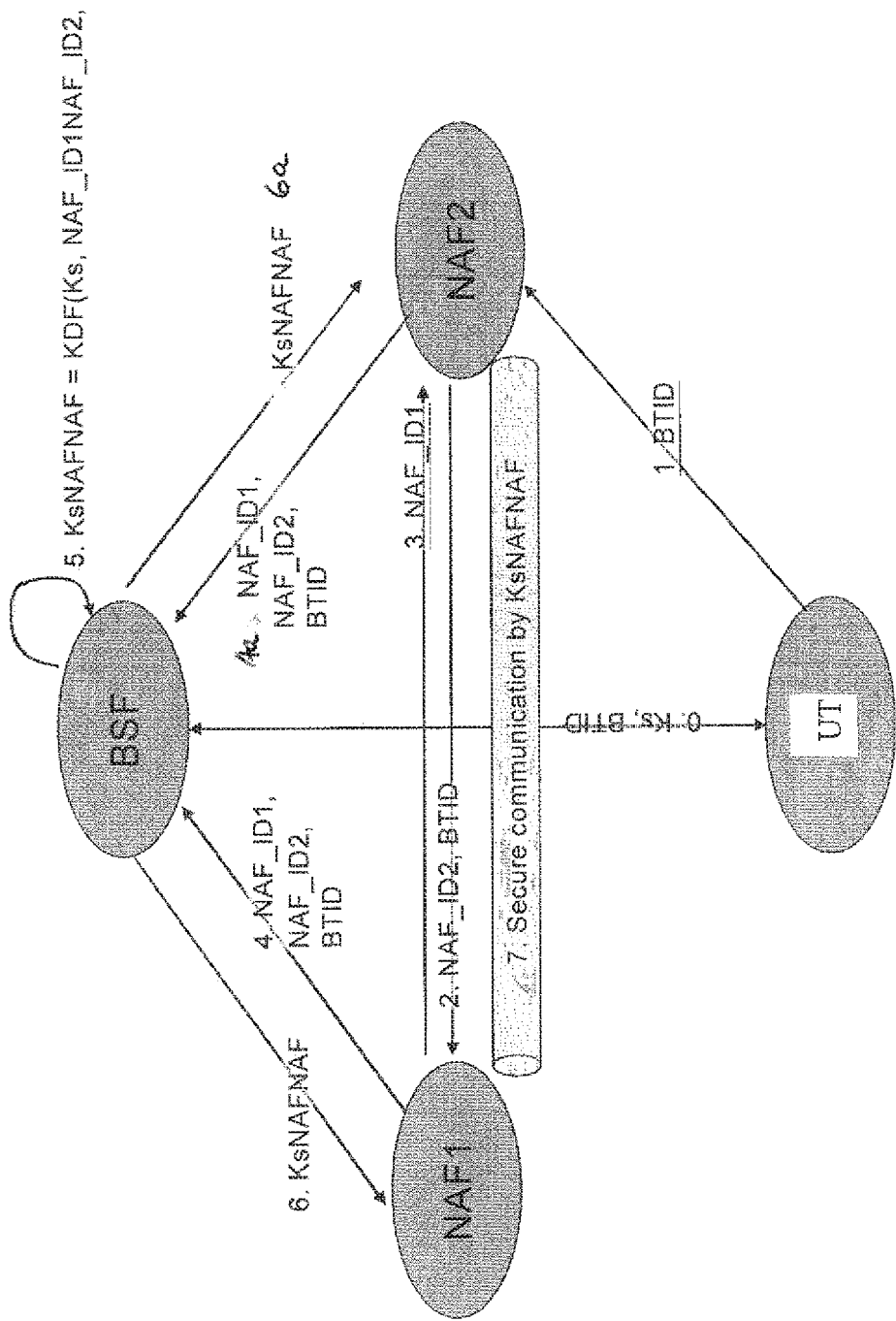
FIG. 2 is a schematic illustration of message flows in a method according to a first embodiment of the invention.

A first embodiment of the invention is shown in FIG. 2. In this embodiment servers NAF1, NAF2 establish one or more keys "autonomously" without direct UT involvement.

The servers NAF1, NAF2 are co-operating to provide a service to the UT. For example NAF1 may be the online shopping site and NAF2 may be the online wallet service of example UC1 above. It is desired to create a secure connection between NAF1 and NAF2, in particular a secure (logical) connection between NAF1 and NAF2 that is in some way associated with the UT—that is, the secure connection will be used only for communications between NAF1 and NAF2, or vice-versa, that relate to the service being provided to the UT.

It is assumed that the user has previously performed GBA "registration" towards a bootstrapping server function BSF (the "on-line" case). The BSF thus has generated a current key, Ks, that is associated with the UT. This is shown as "step 0" in FIG. 2.

The UT initially sends a message containing information that identifies the UT to one of the NAFs, in this example to NAF2 (message 1). (FIG. 2 shows an example where the information that identifies the UT is the UT's B-TID, but the invention is not limited to this.) The message also identifies NAF1 as the other server that will co-operate with NAF2 to provide a service to the UT. For example, in example UC1 this message may be sent to NAF2 when the UT selects (or is assigned by the cloud) NAF2 as the desired on-line wallet service for payment for the products to be provided to the UT by NAF1, and will inform NAF2 that it is desired to make a payment to NAF1.

NAF2 then sends a message (message 2) to NAF1. The message contains information that identifies the UT, for example the UT's B-TID, and also contains an identifier of NAF2 (NAF_ID2). NAF1 responds to this by sending a message (message 3) back to NAF2, which message may contain an identifier of NAF1 (NAF_ID1), although this may not be necessary since NAF2 must necessarily have had some address or identifier for NAF1 for it to have been able to send message 2 to NAF1. For example in a cloud context, NAF1 and NAF2 may already know each others' identities (e.g. in conjunction with the cloud security manager assigning them as resources to the user), in which case it may not be necessary to include identities in the signalling message. In general however, NAF identities may be application specific and separate from the identifiers used at network layer, in which case explicit exchange of identities is required.

In order for NAF1 and NAF2 to establish a secure connection with one another, and which is associated with the UT, they each perform modified GBA bootstrapping of the present invention with the BSF. (Note that the information provided by the UT in message 1, for example the UT's B-TID, also comprises information allowing the NAFs to identify the corresponding BSF.) According to the invention when NAF1 performs bootstrapping (using the 3GPP specified Zn interface defined in TS 33.220) it includes an additional information element (not present in current GBA Zn signalling) that informs the BSF that this is an "inter-NAF request", and that indentifies NAF2 as the other NAF involved. Thus, when NAF1 sends a message (message 4) to the BSF to initiate bootstrapping usage, in addition to NAF1's own ID and the B-TID (identifying the user and Ks), the NAF1 also includes the ID of NAF2 in message. It can do this because, after exchanging messages 2 and 3, NAF1 and NAF2 are each in possession of NAF_ID1, NAF_ID2 and the UT's B-TID (or other identifying information for the UT).

When the BSF receives message 4 from NAF1 it generates and provides to NAF1, the Ks_NAF according to current GBA specification. In addition, BSF generates (shown as 5 in FIG. 2) a special key, denoted as Ks_NAF-NAF, which can be pairwise shared between NAF1 and NAF2. The Ks_NAFNAF is generated based on the existing key Ks for the UT, and based on the identities of NAF1 and NAF2—that is Ks_NAFNAF is a function of Ks, NAF_ID1 and NAF_ID2. After generating the Ks_NAFNAF, the BSF sends a message (message 6) to NAF1 that may contain Ks_NAFNAF (for example encrypted by Ks_NAF) or that may contain information that allows NAF1 to derive the shared key Ks_NAFNAF from Ks_NAF. The BSF also records information necessary for the BSF to be able to later deliver the same key Ks_NAFNAF to NAF2, e.g. information of type (NAF_ID1, NAF_ID2, Ks_NAFNAF_info) and stores it, e.g. in a record indexed by B-TID. Ks_NAF-NAF_info may comprise the key Ks_NAFNAF itself, or any information needed to re-create it. If Ks_NAFNAF is a function of Ks, NAF_ID1 and NAF_ID2, then Ks_NAF-NAF_info may only need to comprise a nonce.

Immediately preceding the key generations in this step, note that the BSF may optionally use some locally stored security policy to authorize NAF1 (and later NAF2) to be granted access to the key Ks_NAFNAF.

NAF2 performs similar bootstrapping with the BSF and obtains the same Ks_NAFNAF (or information that allows NAF2 to derive the shared key Ks_NAFNAF) (messages 4a and 6a).

NAF1 and NAF2 are both now in possession of Ks_NAF-NAF, and this key can now be used for protecting traffic between NAF1 and NAF2 or vice-versa (shown as 7 in FIG. 2) that relates to providing services to the UT. The key(s) obtained by the modified GBA method of the invention may be used in any suitable way by NAF1 and NAF2 to protect communication, for example the key(s) may be used with SSH (Secure Shell) protocol, SSL (Secure Socket Layer) protocol, IPsec (Internet Security Protocol) or any other security protocol.

FIG. 5 illustrates operations carried out by NAF1 in the embodiment of FIG. 2. At 51 NAF1 receives a message (2 in FIG. 2) from NAF2 requesting establishment of a security relationship between NAF1 and NAF2. As described, the message includes an indication of the identity of the context of the bootstrapping protocol. In response to receipt of this message, NAF1 sends, at 52 in FIG. 5, a request (message 4 in FIG. 2) to the BSF to establish a security relationship between NAF1 and NAF2. The request sent to the BSF includes an indication of the context of the bootstrapping protocol. Subsequently at 53 in FIG. 5, NAF1 receives the key from the BSF (message 6 in FIG. 2).

FIG. 6 illustrates operations carried out by BSF in the embodiment of FIG. 2. At 61 the BSF receives a request (message 4 of FIG. 2) from NAF1 to establish a security relationship between the NAF1 and NAF2. The request including an indication of the identity of the context of the bootstrapping protocol—that is, it identifies that the request relates to the provision of services to the UT (or, more strictly, to a terminal that is currently associated with the SIM associated with the context of the bootstrapping protocol).

At 62 of FIG. 6 the BSF generates the key KsNAFNAF (5 of FIG. 2), and at 63 of FIG. 6 the BSF sends NAF1 the key or information from which the key can be derived (message 6 of FIG. 2). As noted, the BSF also records information necessary for the BSF to be able to later deliver the same key Ks_NAFNAF to NAF2 (not shown in FIG. 6).

At 64 of FIG. 6 the BSF receives (message 4a of FIG. 2) a request from NAF2 to establish a security relationship between NAF1 and NAF2. The request from NAF2 also identifies the context of the bootstrapping protocol. At 65, the BSF sends NAF2 the key Ks_NAFNAF or information from which the key Ks_NAFNAF can be derived (message 6a in FIG. 2).

It should be understood that the order in which NAF1 and NAF2 send their requests to the BSF in FIGS. 2 6 is chosen for illustration only, and the request from NAF2 to the BSF could be sent before (or in principle at the same time as) the request from NAF1 to the BSF.

In the example of FIG. 2, the UT includes its B-TID in message 1 as information that identifies the UT to NAF2. The invention does not require that the UT uses its B-TID as the information that identifies the UT, and the UT may use any suitable identifying information. NAF2 will pass the supplied identifying information to NAF1, and NAF1 and NAF2 will include the supplied identifying information in their messages 4, 4a to the BSF. If the BSF does not receive the B-TID of the UT from the UT via NAF1 or NAF2, the BSF may retrieve the B-TID of the UT from the cloud security manager, or it may request it directly from the user.

Figure 7:
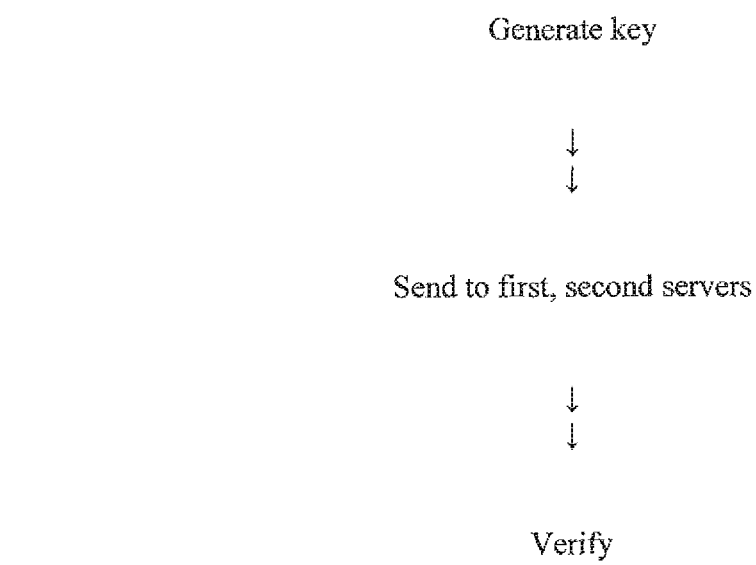
FIG. 7 is a block flow diagram showing principal steps performed by a user terminal in a method according to the second embodiment of the invention.

In a second embodiment of the invention the shared key for protecting communication between the two (or more) servers is generated by the UT. FIG. 7 shows the principal steps of this embodiment. At 71 of FIG. 7 the user terminal, assumed to have performed GBA bootstrapping (using the standard GBA Ua interface) with NAF1, thus creating KsNAF1, generates the shared key Ks_NAFNAF based on the key KsNAF1 for securing communications between the user terminal and NAF1 and on a key (KsNAF2) for securing communications between the user terminal and NAF2. (The UT is thus similarly assumed to have performed GBA bootstrapping with NAF2.) At 72 of FIG. 7 the user terminal sends the key, or information from the key may be derived, to NAF1 and NAF2. This may be sent as a new information element added to the Ua interface or by some other means. NAF1 and NAF2 may then communicate using the shared key.

As is described more fully below, the fact that the shared key Ks_NAFNAF has been generated and sent to NAF1 and NAF2 does not by itself mean that NAF1 and NAF2 are using the key when communicating with one another. It is therefore preferable to verify the existence of the security relationship between NAF1 and NAF2, and this is indicated as 73 in FIG. 7 (although this verification feature is optional). The verification may comprise verifying that NAF1 and/or NAF2 is in possession of the key Ks_NAF-NAF, and/or it may comprise attesting the operation of NAF1 and/or NAf2.

Figure 3:
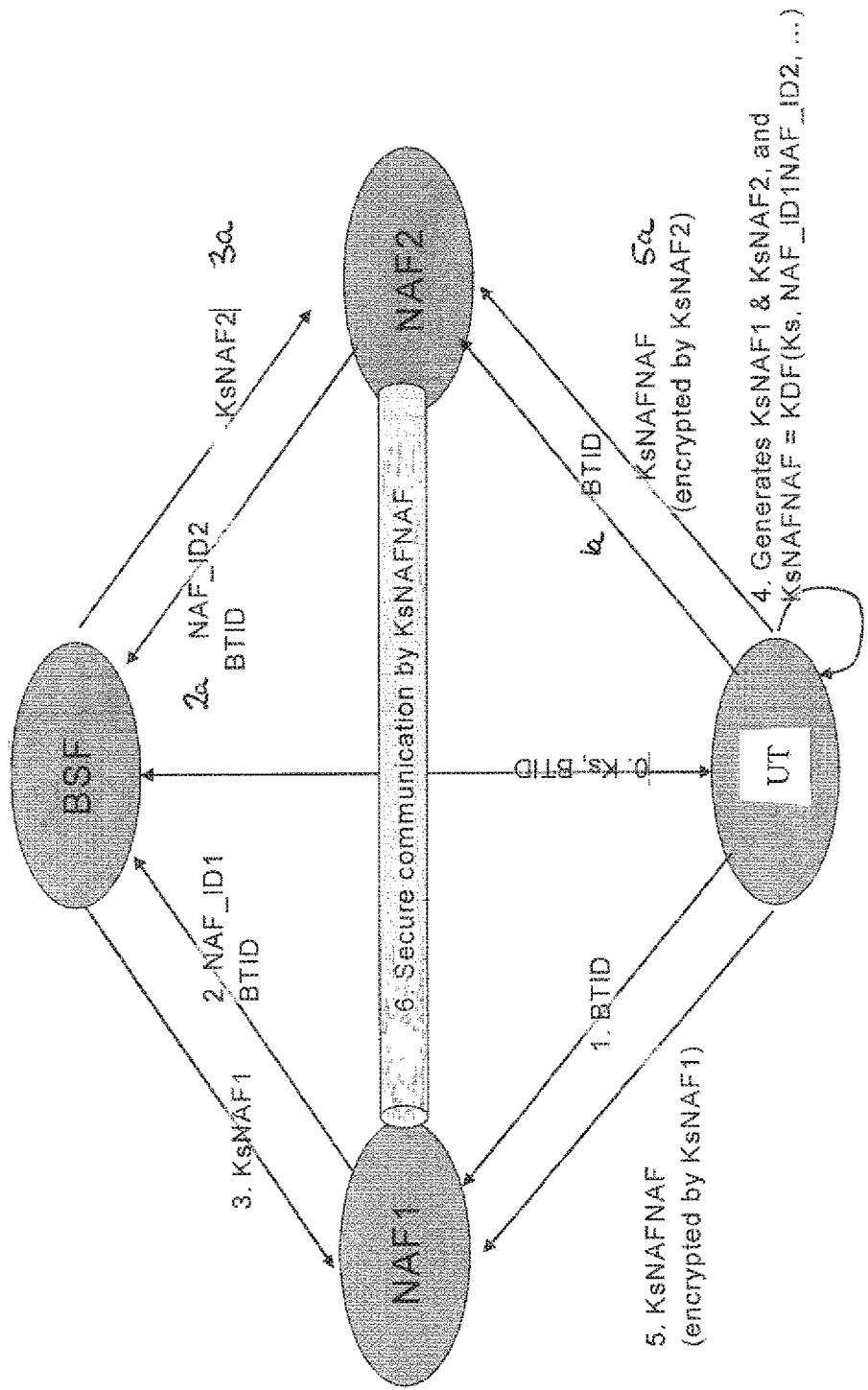
FIG. 3 is a schematic illustration of message flows in a method according to a second embodiment of the invention.

FIG. 3 illustrates the second embodiment of the present invention in more detail. It is again assumed that the user has previously (shown as stage 0 in FIG. 3) performed GBA "registration" (over the GBA Ub interface) towards a bootstrapping server function BSF (the "on-line" case). The BSF thus has generated a current key, Ks, that is associated with the UT.

Next, conventional GBA bootstrapping is carried out (using the Ua interface), to create a shared key between the UT and NAF1 and to create a shared key between the UT and NAF2. To do this, the UT initially sends a message containing information that identifies the UT to NAF1 (message 1) and to NAF2 (message 1a). FIG. 3 shows the B-TID of the UT as the information that identifies the UT (and if needed, also identifies the BSF) but, as explained above, the invention is not limited to this. Then NAF1 sends a message (message 2) to the BSF to initiate bootstrapping, and this message includes NAF1's own ID (NAF_ID1) and the information that identifies the UT (in this example the B-TID). The BSF generates a key, KsNAF1, for securing communication between the UT and NAF1, and sends this key (or information from which the key may be derived) to NAF1 (message 3). If needed (it is not needed if following standard GBA), the BSF also forwards the key KsNAF1 (or information from which the key may be derived) to the UT (not shown), so that both NAF1 and the UT are in possession of KsNAF1. Similarly, NAF2 sends a message (message 2a) to the BSF to initiate bootstrapping, and this message includes NAF2's own ID (NAF_ID2) and the information that identifies the UT (in this example the B-TID). The BSF generates a key, KsNAF2, for securing communication between the UT and NAF2, and sends this key (or information from which the key may be derived) to NAF2 (message 3a). If needed, the BSF also forwards the key KsNAF2 (or information from which the key may be derived) to the UT (not shown), so that both NAF2 and the UT are in possession of KsNAF2.

According to the invention, the UT calculates a key, Ks_NAFNAF, for protecting communication between NAF1 and NAF2 by deriving Ks_NAFNAF from the two separate KS_NAF (or produces KS_NAFNAF is some other way). This is shown as stage 4 in FIG. 3. The UT also records information necessary for the UT to be able to later deliver the same key Ks_NAFNAF to both NAF1 and NAF2. This information could for instance comprise a nonce.

The UT then sends information to each of NAF1 and NAF2 from which NAF1 and NAF2 can derive the same key Ks_NAFNAF (messages 5, 5a). This information could for example be an encryption of Ks_NAFNAF using the individual NAF key (that is KsNAF1 or KsNAF2) as encryption keys, or a "nonce" from which Ks_NAFNAF can be derived (from KsNAF1 and KsNAF2).

NAF1 and NAF2 are both now in possession of Ks_NAFNAF, and this key can now be used for protecting traffic between NAF1 and NAF2 or vice-versa (shown as stage 6 in FIG. 3) that relates to providing services to the UT. As explained with reference to FIG. 2, the key(s) obtained by the modified GBA method of the invention may be used in any suitable way by NAF1 and NAF2 to provide secure communication.

In the examples of FIGS. 2 and 3 above, the B-TID of the UT is used as the information that identifies the UT. As noted, the invention is not limited to use of the B-TID as the information that identifies the UT. In particular, in a modified "GBA Push" embodiment described later in the application it is necessary the information that identifies the UT is something other than the B-TID. This is because GBA Push uses a "UT identity", e.g. IMSI (International Mobile Subscriber Identity).

The key generation method of the invention, for example as shown in FIG. 2 and FIG. 3, provides a key that can be used to provide a secure connection between NAF1 and NAF2. However, the generation of the key Ks_NAFNAF does not by itself mean that both NAF1 and NAF2 will use the key to provide a secure connection. A further embodiment of the invention thus provides a verification feature that allows the user or the user terminal to check that NAF1 and NAF2 are using the correct key.

A first stage of the verification process is for a user to determine that NAF1 and NAF2 are both in possession of the key Ks_NAFNAF. For example, the UT may run a protocol (directly with the servers NAF1, NAF2 or via the cloud security manager) by which the servers NAF1, NAF2 can prove possession of the correct key(s).

Moreover, since "possession" of a key does not imply that the key is actually used, a determination that NAF1 and NAF2 are in possession of the key may further be combined with an attestation that NAF1 and NAF2 are actually operating in a way that uses one or more GBA keys, for example that NAF1 and NAF2 are actually operating under the control of software that is known to use one or more GBA keys. A suitable attestation process is a conventional remote attestation process (e.g. according to TCG, Trusted Computing Group, specifications) that then also provides assurance also to usage of keys. By additionally using remote attestation, the UT is then assured that a NAF has the correct key(s), and is running trusted/verified software which requires use of the key(s)—and this provides reassurance that the NAF will use the key(s) as desired.

There are many suitable protocols that could be run between UT and NAF1/NAF2. One example of a suitable protocol is as follows:

It should be noted that since UT always knows Ks, it can always derive any or all of KS_NAF1, KS_NAF2 and/or KS_NAFNAF. (This requires that the UT is aware of the NAF identities of NAF1 and NAF2. If a method according to embodiment 2 was used, the UT already knows the NAF identities of NAF1 and NAF2. If a method according to embodiment 1 was used, the UT obtains the IDs of the physical and/or virtual machines handling the service, for example from the cloud security manager.) The term "K" is used here to denote any of KS_NAF1, KS_NAF2 or KS_NAFNAF.

Initially, UT generates a random value, R, and sends it to a NAF (e.g. to NAF2);

The NAF uses a pre-agreed cryptographic function, H, and replies by sending h=H(K, R) back to the UT;

The UT receives h' (expected to satisfy h'=h as above), computes H(K,R) and checks that h'=H(K, R).

This proves to the UT that the NAF has K in possession. As mentioned, this can be further combined with usual platform attestation which in the context of the invention server to verify to the UT that the NAF is running software that uses K in a secure way. In fact, since such an attestation response will include a digital signature by the NAF, it may be advantageous to include H(K, R) in that signature.

Another possibility (mainly applicable to embodiment 2) which may offer even higher security/assurance of key possession and/or key usage is that the user/UT encrypts the (description of) virtual machine(s) (VMs) that should execute on the NAF(s). The decryption key necessary to decrypt (and thus to execute) the VM is made, by the UT, dependent on both the key of a so called Trusted Platform Module (as described in TCG specification) associated with the NAF and with at least one of KS_NAF or KS_NAFNAF. This means that unless the associated NAF has KS_NAF (and/or KS_NAFNAF) in its possession, it will not even be able to decrypt the VM and is thus prohibited from executing its code.

It may therefore be seen that the invention provides a number of advantages. The main advantage, of course, is that the invention extends SIM/GBA based security to "the cloud", in a case when two (or more) entities in the cloud are acting together on behalf of a user—the invention makes it possible to for the entities to communicate with one another in a secure way. The invention also provides the user or a network/operator with some additional control over how keys are used, and with some means to verify key usage. The invention can also give operators with a business case providing "security as a service" (key management) in clouds.

In the embodiment of FIG. 2, the shared key Ks_NAFNAF is generated by the BSF, and the UT may operate conventionally. In the embodiment of FIG. 3, in contrast, the shared key Ks_NAFNAF is generated by the UT, and the BSF operates conventionally. "Conventionally" here should be understood from GBA key generation point of view. Of course, it can be beneficial if the BSF functionality further comprises means to verify that the NAFs are authorized to perform "cloud services" for the user, i.e. are authorized to access Ks_NAFNAF. To this end, the BSF optionally could, via the user terminal and/or cloud security manager obtain security policies requested by the user (e.g. a list of trusted cloud providers and/or cloud configurations) and/or policies actually supported by the cloud. The BSF could then compare the user's preference to the provided security, and decide whether to grant access to Ks_NAFNAF. The embodiment of FIG. 3 may be implemented by any suitably-programmed UT—for example, the SIM associated with the UT may support the UT to carry out a method of the invention and in particular to generate the shared key KsNAFNAF. Alternatively, the SIM may be a conventional SIM, and the generation of the shared key may be carried out by a key generation module in the UT.

Figure 8:
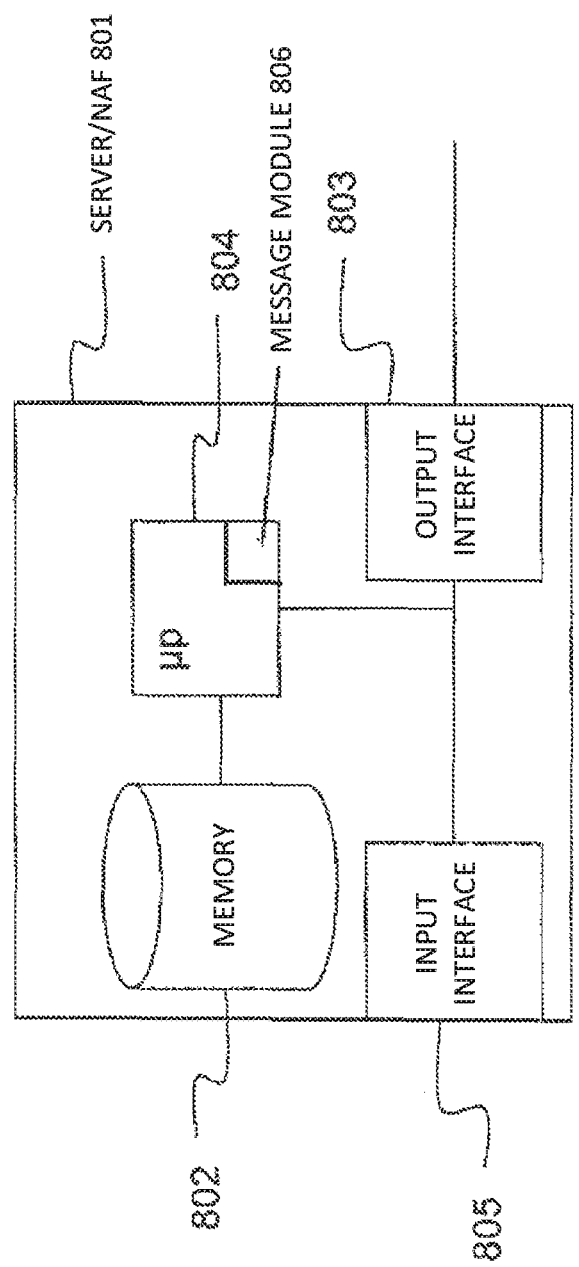
FIG. 8 is a block diagram of an application server according to an embodiment of the invention.

FIG. 8 is a block diagram showing principal components of an NAF 801 according to an embodiment of the invention (for example NAF1 or NAF 2 of FIG. 2 or 3). The NAF has an input interface 805 for receiving messages from the UT (which may comprise GBA Ua communication support), other NAFs and the BSF (which may comprise GBA Zn communication support) and an output interface 803, a processor 804 and a memory 802. These components are, or may be, conventional, and will not be described further.

The NAF 801 further has a module 806 for causing the NAF to operate as described above. For example, the module may case the NAF to, upon receipt of a message from the UT, generate and send, to another NAF, a message including the identity of both the UT and the NAF (eg, message 2 of FIG. 2), and/or to send a request for a shared key to a BSF (message 4, 4a of FIG. 2). The module 806 may be a software module that can be read by and that runs on the processor 804 as indicated in FIG. 8, or alternatively the module 806 may be a hardware module (including software) separate from the processor 804. Where the module 806 is a hardware module the software may be provided on a suitable computer-readable medium such as, for example an optical or magnetic storage medium.

The NAF 801 preferably also is adapted to support verification, for example by the user terminal, that the NAF is in possession of the shared key and/or to support verification by remote attestation of use of the shared key by the NAF. For example, the NAF 801 may comprises a platform attestation module (not shown in FIG. 8) to effect a verification process towards the user terminal as described above, for example to enable verification by the user terminal that the NAF is in possession of the key KsNAFNAF and/or whether the NAF is running trusted software.

Figure 9:
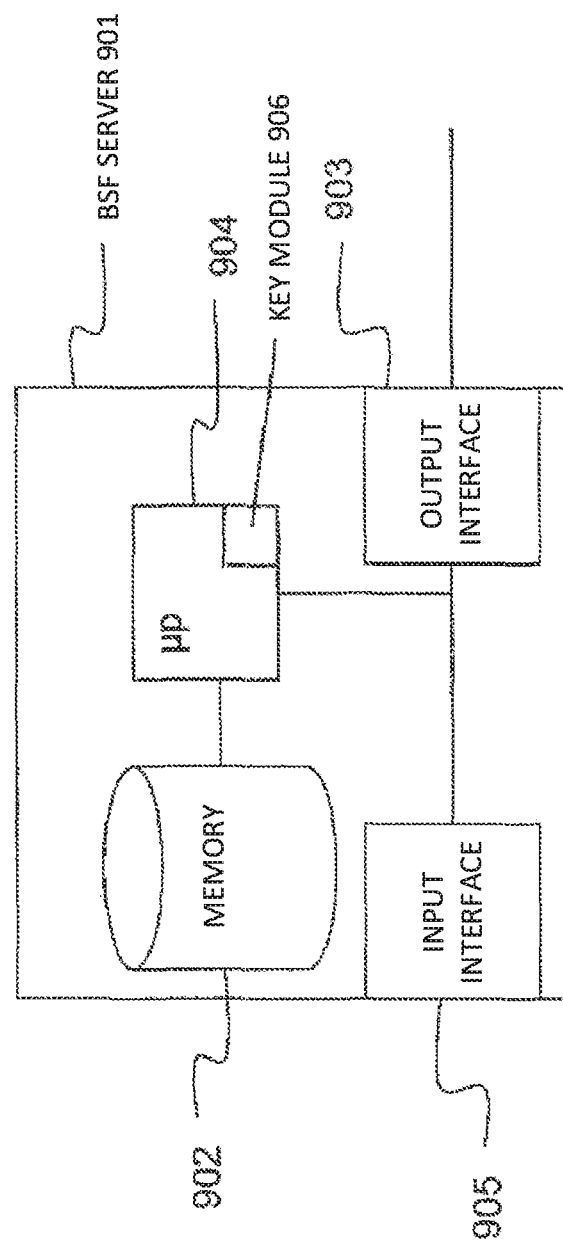
FIG. 9 is a block diagram of a bootstrapping server according to an embodiment of the invention.

FIG. 9 is a block diagram showing principal components of a BSF server 901 according to an embodiment of the invention (for example the BSF server of FIG. 2). The BSF server has an input interface 905 for receiving messages from the UT (which may comprise GBA Ub functionality support), NAF1 and NAF2 (which may comprise GBA Zn functionality support) and an output interface 903, a processor 904 and a memory 902. These components are, or may be, conventional, and will not be described further. (Though not shown, the BSF also has interface for communication with the HSS (Home Subscriber Server) according to standard GBA Zh interface.)

The BSF server 901 further has a module 906 for generating the key Ks_NAFNAF following receipt of a request from NAF1 or NAF2. The module 906 may generate the key Ks_NAFNAF in any suitable manner. The module 906 may be a software module that can be read by and that runs on the processor 904 as indicated in FIG. 9, or alternatively the module 906 may be a hardware module (including software) separate from the processor 904. The module 906 may also record information necessary for the BSF to be able to later deliver the same key Ks_NAFNAF to NAF2, and this information may be recorded in module 906 itself, in memory 902, or in a further memory (not shown). Where the module 906 is a hardware module the software may be provided on a suitable computer-readable medium such as, for example an optical or magnetic storage medium.

The BSF server 901 further has a module 903a for sending the key, or information from which the key may be derived, to NAF1 and NAF2. The module 903a may be part of the output interface 903 of the node as shown in FIG. 9, or the module 903a may be separate from the output interface 1103 of the node.

Figure 10:
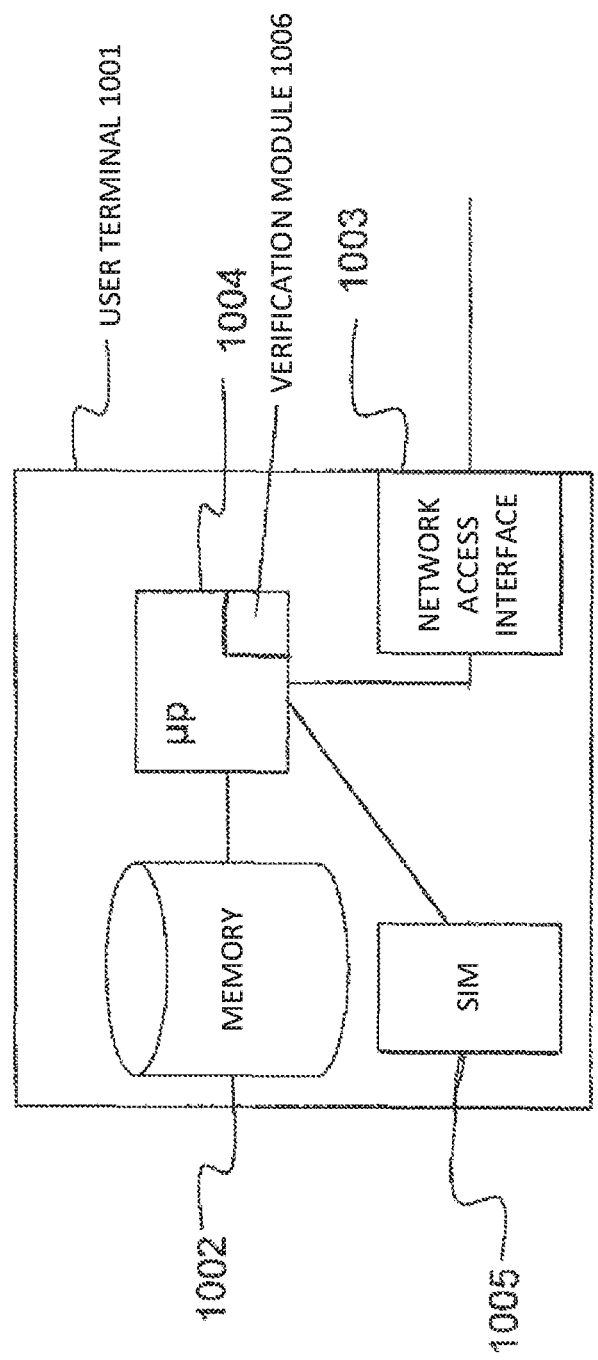
FIG. 10 is a block diagram of a user terminal according to an embodiment of the invention.

FIG. 10 is a block diagram showing principal components of a user terminal 1001 according to an embodiment of the invention, for example the UT of FIG. 3. The user terminal has a network access (wired or wireless) interface 1003, a processor 1004 and a memory 1002. Other components such as a display and a data entry device such as a keyboard (or a component such as a touchscreen that acts as both a display and a data entry device) are omitted for clarity.

The user terminal 1001 further has a Subscriber Identity Module (SIM) 1005. The SIM 1005 may be a so-called SIM-card, (where "SIM-card" is intended to cover any "prefix-SIM-card" such as, for example, a USIM (Universal Subscriber Identity Module)-card, an MCIM etc). Alternatively, the SIM may be any kind of software SIM.

The UT is able to generate the key Ks_NAFNAF. The generation of the key Ks_NAFNAF may be supported by the SIM 1005. For example, in "GBA_U" (a UICC-based version of GBA proposed in 3GPP TSG SA WG3 Security—S3#32, S3-040089, Edinburgh, February 2004), the SIM will support generation of K s and/or KsNAF1/KsNAF2, However in current GBA-U the SIM may not necessarily support generation of Ks_NAFNAF (even if derived from KsNAF1 and KsNAF2), and in this case Ks_NAFNAF may be generated by a suitable key generation module provided in the UT (not shown in FIG. 10) (although a future enhancement of the GBA-U standard may allow the SIM to support generation of Ks_NAFNAF).

It should however be noted that in "GBA_ME", the SIM will always operate conventionally and will not support generation even of Ks, but will only provide other keys from which Ks and/or KsNAF, and Ks_NAFNAF, can be derived by the user terminal (for example by a suitable key generation module (not shown) in FIG. 10). The UT may be able also record information necessary for the UT to be able to later deliver the same key Ks_NAFNAF to both NAF1 and NAF2, and this information may be recorded in memory 1002, in a further memory (not shown) or within the key generation module.

The user terminal 1001 is preferably also able to effect a verification process as described above, for example to determine whether NAF1 and/or NAF2 is in possession of the key KsNAFNAF and/or whether NAF1 and/or NAF2 is running trusted software. For example the user terminal may comprise a verification/attestation module (not shown) that can verify whether NAF1 and/or NAF2 is in possession of the key KsNAFNAF and/or whether NAF1 and/or NAF2 is running trusted software.

The user terminal 1001 may further have a module 1006 for causing the UT to operate as described above. The module 1006 may be a software module that can be read by and that runs on the processor 1004 as indicated in FIG. 8, or alternatively the module 1006 may be a hardware module (including software) separate from the processor 1004. Where the module 1006 is a hardware module the software may be provided on a suitable computer-readable medium such as, for example an optical or magnetic storage medium.

As mentioned, embodiment 1 of the invention (described with reference to FIG. 2) can also be used on a so called "GBA-Push" variant (3GPP TS 33.223). This paragraph describes the necessary modifications, compared to the method shown in FIG. 2, to implement the method of FIG. 2 with GBA-Push. In GBA-Push the UT may or may not be on-line and thus, step 0 of FIG. 2 may not have occurred. In particular, it cannot be assumed that a B-TID is available for use in step 1, 2, or 3 of FIG. 2, and a B-TID can thus not be used as an indication of the identity of the context in these steps. (Steps 1, 2 and 3 of the method of FIG. 2 would occur generally as described above, except that the messages sent in these steps would not include a B-TID but would include some other identifier of the UT.) However, the absence of the UT-bootstrapping (and B-TID) is exactly what GBA-Push addresses. In GBA-Push, the bootstrapping requests are always initiated by an NAF, sending a so called "GPI request" to the BSF. The GPI request would thus typically occur as part of step 4 of FIG. 2, and would initiate the GBA-Push based variant of the invention. Due to the absence of a B-TID in GBA-Push, all GPI request comprises a UT identity, i.e. an IMSI (International Mobile Subscriber Identity) or the like. (The UT identity can be obtained from the cloud manager as discussed before, or in some other way.) This UT identity is thus used as indication of the identity of the context. In response to the GPI request, the BSF generates (in the step corresponding to step 5 of FIG. 2) Ks, Ks_NAF and Ks_NAFNAF and provides (corresponding to step 6 of FIG. 2) a GPI response comprising the key Ks_NAF, Ks_NAFNAF and other data enabling the UT to later re-create the same context, i.e. the random value needed to generate Ks and associated KS_NAF. This means that when later the UT comes on line (e.g. to verify that keys are properly used) the UT would typically obtain the relevant parts of the GPI response from one of the NAFs, enabling it to reconstruct Ks_NAFNAF. (Note that since the GPI response is authenticated, the NAFs cannot forge the GPI response.)

It can also be noted that the invention may also facilitate lawful intercept which can otherwise be complicated in a distributed cloud setting. Specifically, an authorized lawful interception agency could simply request the BSF to provide a key that is shared between the NAFs, thereby enable decryption of the data traffic between the NAFs.

The invention claimed is:

1. A method in a first server operating as a first Network Application Function (NAF), said method comprising establishing a secure connection between the first server and a second server operating as a second NAF, said first and second servers cooperating to provide a service to a user terminal (UT), and said method comprising:
    receiving a message from the second server, requesting establishment of a security relationship between the first server and the second server, the message including an indication of an identity of a context of a bootstrapping protocol that is associated with a Subscriber Identity Module (SIM) of the UT;
    sending a request to a bootstrapping server responsive to receiving the message from the second server, the request including an indication of the identity of the context of the bootstrapping protocol and requesting establishment of the security relationship between the first and second servers; and
    receiving, from the bootstrapping server, a shared key or information from which the shared key can be derived, said shared key for use in establishing the security relationship with the second server, for securing communication between the first and second server for cooperatively supporting the service to the UT, and said shared key based on the context of the bootstrapping protocol and, therefore, associated with the SIM of the UT.

2. The method of claim 1, wherein the first server indicates the identity of the context of the bootstrapping protocol to the bootstrapping server using a Bootstrapping Transaction Identifier (B-TID), as received from the second server.

3. The method of claim 1, further comprising verifying possession of the shared key by the first server in accordance with a remote attestation procedure.

4. The method of claim 1, further comprising using the identity of the context of the bootstrapping protocol to identify the bootstrapping server.

5. The method of claim 1, further comprising performing said steps of sending to the bootstrapping server and receiving from the bootstrapping server as part of performing a Generic Bootstrapping Architecture (GBA) protocol-based operation with the bootstrapping server.

6. The method of claim 1, wherein the first server performs a bootstrapping procedure with the bootstrapping server, receives a key shared between the first server and the bootstrapping server, and wherein the method includes receiving the shared key in encrypted form, and decrypting the shared key using the key shared between the first server and the bootstrapping server.

7. A first server configured for operation as a first Network Application Function (NAF) and further configured to establish a secure connection between the first server and a second server operating as a second NAF, for cooperating with the second server to provide a service to a user terminal (UT), and said first server comprising:
    a communication interface; and
    processing circuitry operative to communicate with the second server and a bootstrapping server via the communication interface, said processing circuitry configured to:
        receive a message from the second server, requesting establishment of a security relationship between the first server and the second server, the message including an indication of an identity of a context of a bootstrapping protocol that is associated with a Subscriber Identity Module (SIM) of the UT; and
        send a request to a bootstrapping server responsive to receiving the message from the second server, the request including an indication of the identity of the context of the bootstrapping protocol and requesting establishment of the security relationship between the first and second servers; and
        receive, from the bootstrapping server, a shared key or information from which the shared key can be derived, said shared key for use in establishing the security relationship with the second server, for securing communication between the first and second server for cooperatively supporting the service to the UT, and said shared key based on the context of the bootstrapping protocol and, therefore, associated with the SIM of the UT.

8. The first server of claim 7, wherein the processing circuitry is configured to indicate the identity of the context of the bootstrapping protocol to the bootstrapping server using a Bootstrapping Transaction Identifier (B-TID), as received from the second server.

9. The first server of claim 7, wherein the processing circuitry is further configured to verify possession of the shared key by the first server in accordance with a remote attestation procedure.

10. The first server of claim 7, wherein the processing circuitry is configured to use the identity of the context of the bootstrapping protocol to identify the bootstrapping server.

11. The first server of claim 7, wherein the processing circuitry is configured to send to the bootstrapping server and receive from the bootstrapping server as part of performing a Generic Bootstrapping Architecture (GBA) protocol-based operation with the bootstrapping server.

12. The first server of claim 7, wherein the processing circuitry is configured to perform a bootstrapping procedure with the bootstrapping server, and, correspondingly, to receive a key shared between the first server and the bootstrapping server, and wherein the processing circuitry is further configured to receive the shared key in encrypted form, and decrypt the shared key using the key shared between the first server and the bootstrapping server.

13. A method in a user terminal (UT) comprising:
performing a bootstrapping procedure with a bootstrapping server, and thereby obtaining an identity of a context of a bootstrapping protocol that is associated with a Subscriber Identity Module (SIM) of the UT;
sending an indication of the identity of the context of the bootstrapping protocol towards at least one of a first and second server operating as respective network application functions (NAFs) that are intended to cooperatively support a service to the UT, to thereby enable the first and second servers to communicate with the bootstrapping server to obtain a shared key that is based on the identity of the context of the bootstrapping protocol, for securing communications between the first and second servers, for cooperatively supporting the service to the UT; and
communicating with at least one of the first and second servers, to verify that the at least one of the first and second servers is in possession of the shared key.

14. The method of claim 13, wherein the method further includes the UT verifying the existence of the security relationship between the first server and the second server.

15. The method of claim 13, wherein the method includes performing a remote attestation procedure with the at least one of the first and second servers, to verify that the at least one of the first and second servers is in possession of the shared key.

16. The user method of claim 13, wherein the bootstrapping procedure is performed in accordance with the Generic Bootstrapping Architecture (GBA) protocol.

17. A user terminal (UT) comprising:
a communication interface configured for communicating with a bootstrapping server and at least one of first and second servers operative as Network Application Functions (NAFs), for cooperatively supporting a service to the UT; and
processing circuitry configured to:
perform a bootstrapping procedure with a bootstrapping server, and thereby obtain an identity of a context of a bootstrapping protocol that is associated with a Subscriber Identity Module (SIM) of the UT;
send an indication of the identity of the context of the bootstrapping protocol towards at least one of the first and second servers, to thereby enable the first and second servers to communicate with the bootstrapping server to obtain a shared key that is based on the identity of the context of the bootstrapping protocol, for securing communications between the first and second servers, for cooperatively supporting the service to the UT; and
communicate with at least one of the first and second servers, to verify that the at least one of the first and second servers is in possession of the shared key.

18. The UT of claim 17, wherein the processing circuitry is configured to verify the existence of the security relationship between the first server and the second server.

19. The UT of claim 17, wherein the processing circuitry is configured to perform a remote attestation procedure with the at least one of the first and second servers, to verify that the at least one of the first and second servers is in possession of the shared key.

20. The UT of claim 17, wherein the processing circuitry is configured to perform the bootstrapping procedure in accordance with the Generic Bootstrapping Architecture (GBA) protocol.

21. A method performed by a bootstrapping server comprising:
performing a bootstrapping procedure with respect to a user terminal (UT), resulting in an identity of a context of a bootstrapping protocol that is based on a Subscriber Identity Module (SIM) of the UT;
subsequently receiving respective bootstrapping requests from first and second servers operating as respective Network Application Functions (NAFs) that are cooperating to support a service to the UT;
identifying, with respect to each one of the respective requests, that the request indicates the identity of the context of the bootstrapping protocol, and, in response:
performing a bootstrapping procedure towards the respective server;
generating a shared key that is based on the identity of the context of the bootstrapping protocol, or generating information for deriving the shared key; and
securely sending the shared key, or the information for deriving the shared key, to the respective server, and thereby providing each respective server with the shared key, for use in securing communications between the respective servers, for cooperating to support the service to the UT.

22. A bootstrapping server comprising:
a communication interface configured for communicating with a User Terminal (UT) and with first and second servers operating as respective Network Application Functions (NAFs) intended to cooperate to support a service to the UT; and
processing circuitry configured to:
perform a bootstrapping procedure with respect to the UT, resulting in an identity of a context of a bootstrapping protocol that is based on a Subscriber Identity Module (SIM) of the UT;
subsequently receive respective bootstrapping requests from the first and second servers;
identify, with respect to each one of the respective requests, that the request indicates the identity of the context of the bootstrapping protocol, and, in response to that identification:
perform a bootstrapping procedure towards the respective server;
generate a shared key that is based on the identity of the context of the bootstrapping protocol, or generating information for deriving the shared key; and
securely send the shared key, or the information for deriving the shared key, to the respective server, and thereby provide each respective server with the shared key, for use in securing communications between the respective servers, for cooperating to support the service to the UT.

\* \* \* \* \*